United States Patent [19]

Perry

[11] 4,267,406
[45] May 12, 1981

[54] APPARATUS UTILIZING PORTIONS OF A CONVENTIONAL TELEPHONE INSTALLATION FOR SELECTIVELY CONTROLLING ELECTRICALLY OPERATED, TEMPERATURE REGULATING EQUIPMENT

[76] Inventor: James E. Perry, 9814 Hardesty, Kansas City, Mo. 64134

[21] Appl. No.: 69,710

[22] Filed: Aug. 27, 1979

[51] Int. Cl.³ ............................................. H04M 11/00
[52] U.S. Cl. .................................................... 179/2 A
[58] Field of Search ................... 179/2 R, 2 A, 2 AM; 340/147 R; 236/1 B, 47, 51

[56] References Cited

U.S. PATENT DOCUMENTS

| 4,021,615 | 5/1977 | James et al. | 179/2 A |
| 4,107,466 | 8/1978 | Churchill | 179/2 A |
| 4,174,064 | 11/1979 | Pratt, Jr. | 179/2 A |

Primary Examiner—Alfred H. Eddleman
Assistant Examiner—Joseph A. Popek
Attorney, Agent, or Firm—Schmidt, Johnson, Hovey & Williams

[57] ABSTRACT

Energy saving apparatus for selectively controlling the heating and/or cooling equipment in rooms of hotels, motels or the like permits automatic, thermostatically regulated deactivation of such equipment when the room is unoccupied and the temperature in the room is within a preselected range, automatic reactivation of such equipment when such temperature falls below or rises above such range, and controlled reactivation of such equipment when the room ready for occupancy. The apparatus advantageously utilizes portions of a typically pre-existing, conventional telephone installation, and particularly the tip and ring lines between a central station and a telephone in each room, for carrying all electrical power and signals required for effecting such temperature control. The polarity of energization of such lines for temperature controlling operation is reversed from that employed for normal telephone operation, and the temperature controlling parts of the apparatus are non-responsive to power of the polarity applied to such lines during normal telephone operation. The apparatus permits selection of either temperature controlling operation, normal telephone operation or message alert signaling operation by simple manipulations of a single electrical switch component for each room by an operator at the central station.

7 Claims, 3 Drawing Figures

APPARATUS UTILIZING PORTIONS OF A CONVENTIONAL TELEPHONE INSTALLATION FOR SELECTIVELY CONTROLLING ELECTRICALLY OPERATED, TEMPERATURE REGULATING EQUIPMENT

BACKGROUND OF THE INVENTION

1. Field of the Invention

This invention relates to the electrical control from a remote point of equipment for heating and/or cooling living space areas and, more particularly, to apparatus for effecting such control over temperature altering devices in rooms of hotels, motels or the like in a manner utilizing portions of a conventional telephone installation to minimize the additional components and connections required. The invention aids in the conservation of energy through the selective exertion of temperature control over unoccupied rooms, while permitting normal telephone operation, message alert signalling and local control over temperature when the room is occupied.

2. Description of the Prior Art

Insofar as I am aware, prior efforts to provide control over the operation of remote temperature altering devices such as employed in the guest rooms of hotels, motels and the like either have utilized separate control wires specially provided for such purpose and extending from a central area from which control is to be exerted to each of the rooms to be controlled or have attempted to utilize electrical power wiring to carry special control signals superimposed upon the line power and requiring special devices to generate and receive. Either of such prior approaches is manifestly more complex and/or expensive than my invention, which, for example, utilizes the "tip" and "ring" coupling lines typically already existing and in place between a central control area and the various guest rooms of the establishment as a part of a conventional telephone installation at such establishment.

SUMMARY OF THE INVENTION

This invention overcomes the complexities and needless expense attending all prior efforts to solve the same problem, which are known to me. The invention is characterized by utilizing portions of a conventional telephone installation, including the tip and ring coupling lines thereof and the direct current power source normally provided in such installations having facilities for message alert signalling, and is adapted for selective operation as to each room or area being controlled in either a normal telephone operation mode or a message alert signalling mode when the room is occupied or in a temperature controlling mode when the room is unoccupied. The apparatus of the invention is so arranged that selection of the mode of operation for each room or area being controlled can be quickly accomplished by manipulation of a single corresponding switch located within a central control area, which switches will typically be disposed adjacent the regular switchboard or operator control panel forming a part of the telephone installation of the establishment. The apparatus of the invention is further characterized by its employment when in the temperature controlling mode of a direct current potential applied to the tip and ring coupling lines which is of opposite polarity from the direct current potential normally applied to such lines by the telephone system when the apparatus is in its normal telephone operation or message alert signalling modes. Since the provision at the central control area of some form of switching means for each guest room is necessary in telephone installations including a message alert signalling function anyway, the substitution for those switches of switching structures for implementing this invention involves minimal effort and expense. In addition to the substitution of such switching structures and the connections and minor components associated therewith, the apparatus of the invention further requires essentially only an electrically responsive switching means, such as a relay, having its switch coupled into the operating circuit for the heating and/or cooling equipment for each room being controlled and having the control leads of its actuating means coupled with the tip and ring coupling lines for the telephone in such room by a coupling circuit including one or more thermostatically controlled switches within such room for establishing temperature limits and a unidirectional current flow component such as a diode for causing such coupling circuit and its device controlling switching means to respond only to an electrical potential between the tip and ring coupling lines which is opposite in polarity to the energization of such lines during normal telephone operation or message alert signalling. If not already provided in the telephones of the telephone installation being utilized, unidirectional current flow components such as diodes may be added to the internal circuitry of the telphones or the connection leads associated therewith for preventing the flow of current through parts of the telephones during operation of the apparatus in its temperature controlling mode in which such opposite polarity potential is being presented to the connection leads of the telephones.

DESCRIPTION OF THE PREFERRED EMBODIMENT

Figure 1:
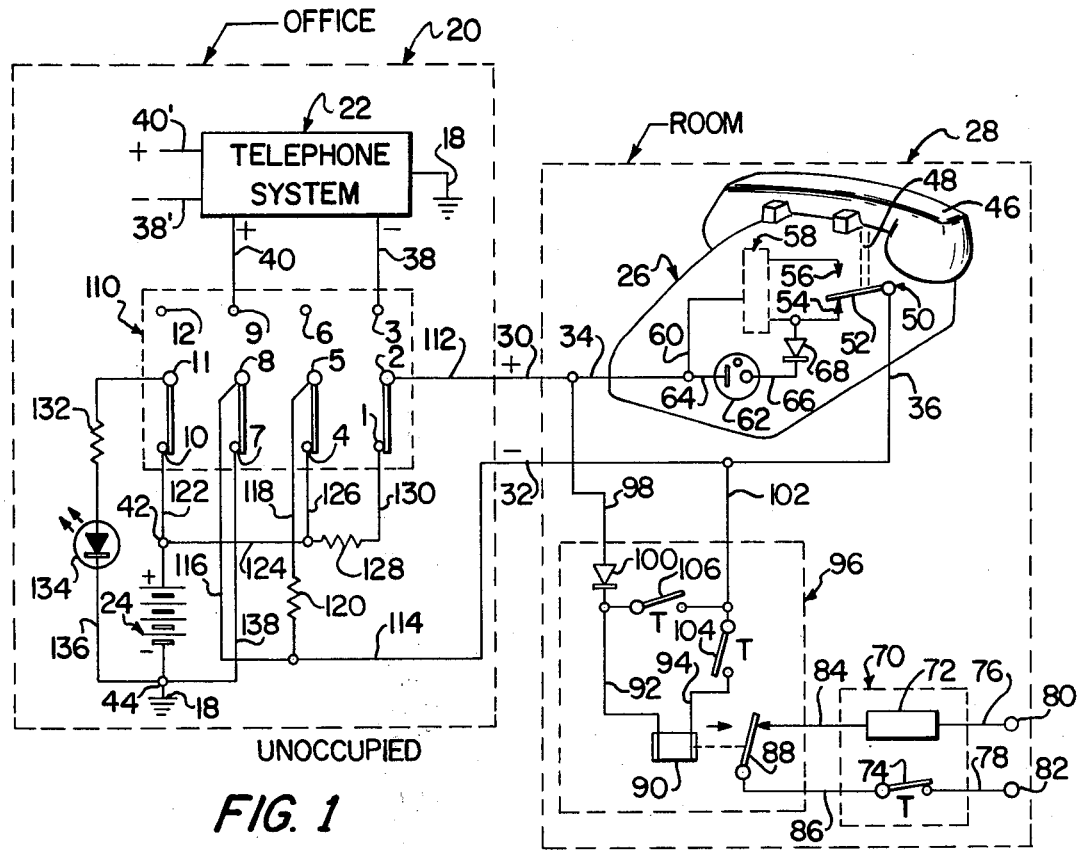
FIG. 1 is a schematic diagram of apparatus for implementing my invention, depicting the same in its temperature controlling mode of operation.

Referring initially to FIG. 1, certain portions of a conventional telephone installation and of conventional room heating and/or cooling equipment, such as typically employed in hotels, motels or the like, will first be identified.

Those portions of a conventional installation for providing telephone service to a hotel, motel or the like, which are disposed upon the premises of such an establishment itself, typically include a telephone company junction box adapted for connection with external phone service lines and a local operator switchboard located within an office or central control area 20, which are collectively depicted by the block 22 labeled "Telephone System" in the drawing; a source of direct current electrical potential 24 usually provided in the central area 20 for use in implementing a message alert signalling function; a telephone 26 located in each of a plurality of guest rooms or remote areas 28 (only one of which is illustrated in the drawing); and a pair of coupling lines 30 and 32, respectively commonly referred to as the "ring line" and the "tip line", which extend from the connection leads 34 and 36 of each telephone 26 to the central area 20.

The telephone system 22 has a pair of telephone line leads 38 and 40, respectively herein referred to as the "ring lead" and the "tip lead", for each telephone 26, which during normal telephone operation must be respectively coupled with the ring line 30 and the tip line 32 running to the corresponding telephone 26 (one additional set of ring and tip leads for another telephone 26 being illustrated as emanating from the telephone system 22 at 38' and 40'). Those skilled in the art will be aware that the ring and tip leads 38 and 40, in addition to providing for the communication of audio and various other telephone function signals to and from the telephone system 22 and each telephone 26, are continuously energized by the system 22, so as to present a direct current potential between each pair of leads 38 and 40 of polarity such as to make the ring lead 38 negative with respect to a common ground 18 and the tip lead 40 positive with respect to the ring lead 38 (although "floating" with respect to ground). Although the potential applied by the system 22 between the telephone line leads 38 and 40 may differ in various conventional telephone installations, a typical value is 48 volts, and that value will be assumed for purposes of illustration hereinafter.

The direct current potential source 24, although depicted for illustration as a battery, manifestly may be any other means suitable for supplying a potential of the required polarity between a positive source terminal 42 and negative source terminal 44. Note that the negative terminal 44 of source 24 is coupled to the common ground 18, so that the potentials of the source 24 and the system leads 38 and 40 can be additively utilized during message signalling. A potential value of 48 volts for source 24 has been found satisfactory with a potential of the same level between the telephone line leads 38 and 40, and again that value will be assumed for illustrative purposes hereinafter.

Each telephone 26 is provided with a shiftably removable "receiver" or hand set 46 adapted to operate, through a reciprocable plunger 48, a single pole, double throw internal switch 50 having a pole 52, a contact 54 engaged by the pole 52 when the hand set 46 is in its "hung up" or standby position, and a contact 56 engaged by the pole piece 52 when the hand set 46 is lifted into a use position thereof. The contacts 54 and 56 are separately coupled with the internal components and circuitry of the telephone 26, which are collectively depicted in the drawing by the block 58. The ring connection lead 34 is coupled with the internal circuitry 58 of the telephone 26 by a lead 60, and the tip connection lead 36 of the telephone 26 is coupled with the pole piece 52 of the internal switch 50. In telephone installations providing message alert signalling, the telephone 26 also embodies a message alert indicator 62, which may be a neon bulb as indicated for illustration in FIG. 1 or may be a light emitting diode component. The indicator 62 is coupled between the ring connection lead 34 and the contact 54 of the internal switch 50 by leads 64 and 66. Particularly when a neon bulb is employed for the indicator 62, if the internal circuitry of the telephone 26 does not already provide the same, it is desirable that an unidirectional current flow diode 68 be coupled in series with the indicator 62, such as indicated in FIG. 1 by coupling thereof in the lead 66. Those skilled in the art will be aware that the message alert indicator 62 is normally implemented with a component requiring a higher "firing" potential than that provided to the telephone 26 from the system 22 during normal telephone operation. For example, with potentials of 48 volts available from each of the system 22 and the source 24, as assumed for illustration, since the additive value of those potentials when coupled in series will be 96 volts, the indicator component 62 should preferably be adapted to "fire" to give a message alert signal when the effective potential applied there across is something more than 48 volts and no greater than the 96 volts assumed to be available for energizing the indicator 62. In this manner, the indicator 62 will remain dormant with merely the 48 volt potential from the system 22 applied thereto, as would occur during normal telephone operation, but would respond to the application thereto of the approximately 96 volt potential applied thereto from the additive coupling of the potentials of the system 22 and the source 24, as occurs during message alert signals, from which it will also be appreciated that this is the reason that an auxiliary potential source 24 is provided in telephone installations providing a message alert signalling function.

Those portions of conventional heating and/or cooling equipment, as typically employed in the guest rooms of hotels, motels or the like, are generally indicated by the block 70 located in each room or remote area 26. Such equipment typically includes any suitable form of electrically operated heating and/or cooling device 72, which frequently will be in the form of a so-called "heat pump", a locally adjustable thermostatically controlled switch 74 and an electrical operating circuit for the device 72 embodying the thermostatic switch 74, and further including power leads 76 and 78 respectively coupled with a pair of power terminals 80 and 82, together with normally interconnected leads 84 and 86 for completing the operating circuit. It will be observed that, with the apparatus of this invention, the leads 84 and 86 are not directly interconnected, but rather are adapted for interconnection by switching means 88 interposed in series therebetween.

The switching means 88 and its associated actuating means 90, which may conveniently be implemented as a relay having control leads 92 and 94, form a part of the additional componentry and circuitry supplied by my apparatus for accomplishing the purposes of the invention. The switching means 88 and its associated actuating means 90 may satisfactorily be implemented with a mode R10T, direct current relay having a 5,000 ohm resistance coil available from Potter & Brumfield, of Princeton, Ind. In the same category, and set off from the temperature altering equipment 70 and the telephone 26 by a block 96 in FIG. 1, are circuit means for coupling the control leads 92 and 94 with the ring coupling line 30 and the tip coupling line 32 respectively. Such coupling circuit includes a lead 98 having a unidirection current flow diode component 100 coupled in series therewith and serving to interconnect the ring lead 30 with the control lead 92 for flow of current from the former to the latter only when the potential of the ring line 30 is positive with reference to the potential of the tip line 32. Such coupled circuit further includes a lead 102 having a thermostatically controlled switch 104 connected in series therewith for coupling the tip line 32 with the control lead 94 when the thermostatic switch 104 is closed. Finally, such coupling circuit includes a further thermostatically controlled switch 106 connected in shunt across such coupling circuit, preferably between the leads 92 and 102. The thermostatic switch 104 is responsive to the relationship of the ambient temperature within room area 28 to a preselected low limit level, for example 55 degrees F., so as to be open when the ambient temperature is below that level and to be closed when the ambient temperature is above that level. Similarly, the thermostatic switch 106 responds to the relationship of the ambient temperature within room area 28 to a preselected high limit level, for example 85 degrees F., so as to be open when the ambient temperature is below that level and to be closed when the ambient temperature is above such level. Obviously, the particular low limit and high limit temperature levels can be preselected at whatever values best suit the application involved.

It should be appropriate at this point to consider the operation of the temperature controlling means 96 which the apparatus of the invention provides in association with the heating and/or cooling equipment 70, assuming that a positive potential is applied from the central control area 20 to the ring coupling line 30 with respect to the potential being applied to the tip coupling line 32 from the central control area 20. The means for thus energizing the coupling lines 30 and 32 will be further discussed hereinafter, but it should suffice for the moment to note that the mentioned polarity of the potential upon the coupling lines 30 and 32 will exist when an operator at the central control area 20 has appropriately set certain switching structure 110 in the control area 20 to a condition for invoking the temperature controlling mode of operation of my apparatus with respect to a particular room area 28 which is then unoccupied. If the thermostatic switch 104 is closed and the thermostatic switch 106 is open, which would correspond to an ambient temperature in the unoccupied room area 28 of between 55 degrees F. and 85 degrees F., current will flow from the positive potential upon coupling line 30 through lead 88, diode 100 and control lead 92 to the actuating coil 90 and thence through the control lead 94, the assumedly closed thermostatic switch 104 and the lead 102 to the lower potential coupling line 32; this will energize the actuating coil 90, which in turn will open the associated switching means 88, thereby breaking the operating circuit for the heating and/or cooling device 72 and deactivating the latter. This is the function desired for conserving energy with respect to unoccupied room areas 28 and essentially involves disabling the heating and/or cooling device 72 as long as the ambient temperature within the unoccupied room area 28 remains anywhere within a relatively wide range between preselected high and low limit levels. Once a previously unoccupied room area 28 is being occupied by a guest, the operator in the controlling area 20 will manipulate the switching structure to the condition illustrated in FIG. 2, which for the moment it need only be observed results in the polarity of the potential applied to the coupling lines 30 and 32 being reversed, so that the ring line 30 becomes the negative line and the tip line 32 becomes the positive line; when that occurs, the diode 100 prevents the flow of current through the above mentioned coupling circuit and the actuating means 90, regardless of the condition of the thermostatic switches 104 and 106, which results in the switching means 88 returning to a closed condition restoring the continuity of the operating circuit for the heating and/or cooling device 72, which then functions under the control of the desired temperature level to which the local thermostatic switching means 74 conventionally associated therewith is set.

It remains to consider the function of the thermostatic switches 104 and 106 when the apparatus is in its temperature controlling mode of operation for a particular room area 28. If the ambient temperature in such room area 28 should fall below 55 degrees F., from which level it would be uneconomical or impractical to quickly reheat such room area 28 upon occupancy thereof by a guest, the thermostatic switch 104 opens, as illustrated in FIG. 1, thereby deenergizing the actuating means 90, permitting the switching means 88 to close and restoring the operating circuit for the heating and/or cooling device 72 until the latter has re-heated the area 28 to a temperature above 55 degrees F., whereupon the thermostatic switch 104 will reopen to deactivate the heat equipment 72. Thus the apparatus of the invention serves to maintain the ambient temperature within the room area 28 near a preselected low limit level from which such area can be efficiently re-heated to a comfortable temperature level upon occupancy by a guest. Similarly, the shunt coupled thermostatic switch 106 is adapted when open to permit energization of the actuating means 90 to open the switching means 88, but will prevent energization of the actuating means 90 to open the switching means 88 whenever the thermostatic switch 106 is closed. Since the thermostatic switch 106 remains open at ambient temperatures below the preselected high limit level of, say, 85 degrees F., and assuming that the device 72 is functioning in a cooling mode thereof, and further assuming that the ambient temperature is above 55 degrees F., so that the thermostatic switch 104 will be closed, the actuating means 90 will remain energized to maintain the cooling device 72 deactivated unless and until the ambient temperature should exceed the high limit level of, say 85 degrees F. Upon the ambient temperature rising above the preselected high limit level, however, the thermostatic switch 106 will close, thereby deenergizing the actuating means 90, permitting the switching means 88 to close and restoring the operating circuit for the cooling device 72 so that the latter may operate to cool the room area 28 down to an ambient temperature at least slightly below the assumed 85 degrees F. high limit level, whereupon the thermostatic switch 106 will reopen to permit reenergization of the actuating means 90, reopening of the switching means 88 and deactivation of the cooling device 72.

Figure 2:
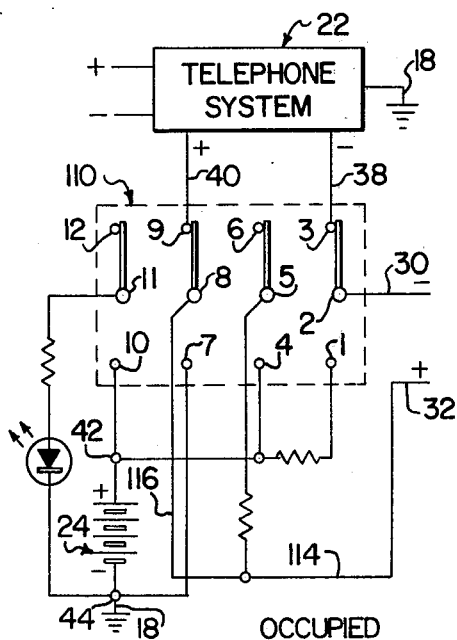
FIG. 2 is a schematic diagram of the portion of such apparatus within the central control area, depicting the same in its normal telephone operation mode.
Figure 3:
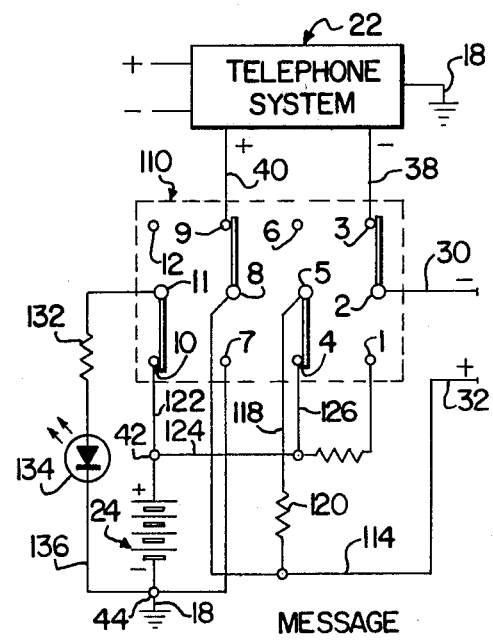
FIG. 3 is a schematic diagram of the portion of such apparatus within the central control area, depicting the same in its message alert signalling mode of operation.

It may be noted, in passing, with reference to FIG. 3, that when the switching structure 110 for a particular room area 28 is in its message alert signalling condition, the potential applied to the coupling lines 30 and 32 is of the same polarity as during normal telephone operation as illustrated in FIG. 2, that is, the ring coupling line 30 will be the negative line and the tip coupling line 32 will be the positive line, so that the diode 100 will disable the temperature controlling portion of the apparatus just described in the same manner when the apparatus is in its message alert signalling mode as when it is in its normal telephone operation mode, since the polarity of energization of the coupling lines 30 and 32 is the same for both of such modes (even though the magnitude of such potential will be greater in the message alert signalling mode than in the normal telephone operation mode). It will thus be apparent that the apparatus of the invention accomplishes its temperature controlling functions through utilization of the same coupling lines 30 and 32 as employed for normal message alert signalling by virtue of its use of reversed polarity energization of the coupling lines 30 and 32 when the apparatus is in its temperature controlling mode with respect to a particular unoccupied room area 28.

It should be apparent to those skilled in the art that the switching structure 110 within the control area 20 for each of the telephones 26 may be implemented with various types of switching components. One that has been found satisfactory and is illustrated in the drawing is the model 7411, four pole, three position, rocker switch available from C & K Components, Inc., of Watertown, Mass., which switching structure includes four pole pieces, 2, 5, 8 and 11, respectively engagable with contacts 1 or 3, contacts 4 or 6, contacts 7 or 9 and contacts 10 or 12. In what may be called the down position of such switching structure 110, the poles 2, 5, 8 and 11 thereof are respectively engaged with the contacts 1, 4, 7 and 10, which is the condition of the switching structure 110 utilized for actuating temperature control over an unoccupied room area 28, as illustrated in FIG. 1 of the drawing. As illustrated in FIG. 2 of the drawing, the condition of the switching structure 110 employed for normal telephone operation in a given room area 28, which may be called the up position, involves the engagement of the poles 2, 5, 8 and 11 with the contacts 3, 6, 9 and 12 respectively. Similarly, as illustrated in FIG. 3, what may be called the center position of the switching structure 110, which is employed for message alert signalling, involves a condition of the switching structure 110 in which the poles 1, 5, 8 and 11 are engaged with the contacts 3, 4, 9 and 10 respectively. The reference numerals applied to the poles and the contacts of the switching structure 110 coincide with the corresponding terminal numbers assigned by the manufacturer of the mentioned component illustrating the implementation of the switching structure 110.

Similarly, and perhaps to an even greater extent, those skilled in the art will recognize both that the specific connections made to the switching structure 110 may depend upon the nature of the component by which the latter is implemented and that variants of such connections may well be possible without altering the ultimate effect of operation of the switching structure 110 needed for the practice of my invention. Accordingly, although connections which I have found satisfactory for practicing the invention are depicted in the drawing and described hereunder for illustrative purposes, and although they may be regarded as currently preferred, they realistically should probably be understood as more illustrative than restrictive, and it is contemplated that the apparatus of my invention could possibly or even probably be implemented by those skilled in the art with various equivalent forms of switching structures 110 and connections associated therewith.

For the purposes of illustration, however, the connections made with the switching structure 110 in the currently preferred embodiment are as follows:

The telephone line leads 38 and 40 of the telephone system 22 are respectively coupled with the contact terminals 3 and 9 of the illustrated switching structure 110 for the illustrated telephone 26 (and the corresponding leads 38' and 40' for the other telephones 26 in other room areas 28 would be similarly connected with their corresponding switching structures 110).

The ring coupling line 30 for each telephone 26 is coupled with the pole terminal 2 of the corresponding switching structure 110 by a lead 112, and the corresponding tip coupling line 32 is connected with the pole terminal 8 of the corresponding switching structure 110 by leads 114 and 116. The pole terminal 5 of each switching structure 110 is coupled with the leads 114 and 116 via a lead 118 and a current limiting series resistance 120. The positive terminal 42 of the potential source 24 is coupled with the contact terminal 10 of each switching structure 110 via a lead 122, with the contact terminal 4 thereof via leads 124 and 126, and with contact terminal 1 thereof via lead 124, a current limiting series resistance 128 and a lead 130. The pole terminal 11 of each switching structure 110 is coupled through a current limiting series resistance 132 with one side of a LED indicator 134 located adjacent the corresponding switching structure 110, the opposite side of which indicator is connected with the negative terminal 44 of the source 24 and the common ground 18 via a lead 136. The contact terminal 7 of each switching structure 110 is coupled with the negative source terminal 44 and a common ground 18 via a lead 138. Although the values of the current limiting series resistances 120, 128 and 132 will be dependent upon the potential supplied to the telephone line leads 38 and 40 by the particular telephone system 22, the potential of the source 24, the "firing" potential of the message alert signalling indicator 62 and, perhaps, other possible idiosyncrasies of a particular telephone installation with which the apparatus of the invention is to be employed, with the various values of potentials herein being assumed for illustration, satisfactory values for the resistances 120, 128 and 132 have been found to be 42,000 ohms, 6,500 ohms and 12,000 ohms respectively.

Referring to FIG. 2 and the right hand portion of FIG. 1 which illustrates the room area 28 in which an associated telephone 26 and associated temperature regulating equipment 70 are located, it will be seen that for normal telephone operation with such room 28 occupied, the telephone ring line lead of the system 22 is coupled via the contact terminal 3 and the pole terminal 2 of the corresponding switching structure 110 with the associated ring coupling line 30, and via the latter with the ring connection lead 34 of the associated telephone 26, while the corresponding telephone tip lead 40 is coupled via contact terminal 9 and pole terminal 8 of the switching structure 110 and the leads 116 and 118 with the corresponding tip coupling line 32, and via the latter with the tip connection lead 36 of the corresponding telephone 26. In this condition, the telephone system 22 is directly coupled with the telephone 26 in the usual manner, the other components and circuitry associated with the switching structure 110 are effectively disconnected, and the coupling circuit 96 and the temperature regulating equipment 70 are effectively isolated in an electrical sense from the ring line 30 and ring lead 34 and the tip line 32 and tip lead 36 by the unidirectional current flow component 100 of the coupling circuit 96, which will not permit flow of current through the latter when the ring coupling line 30 is at a negative potential with respect to the tip coupling line 32, as is the case during such normal telephone operation.

Similarly, referring to FIG. 3 and the right hand portion of FIG. 1, it will be seen that, with the apparatus in its message alert signalling condition, the telephone ring line lead 38 of the system 22 is connected with the corresponding ring coupling line 30 and ring connection lead 34 of the telephone 26 in the same manner as previously described for normal telephone operation, it being significant to note in connection with the message alert signalling mode, however, that the lead 38 and line 30 are being maintained by the system 22 at a definite negative potential with respect to the common ground 18 (while the positive lead 40, although at or near a more positive potential normally equivalent to ground potential during normal telephone operation, is actually "floating" with respect to ground during message alert signalling operation). Thus, although the floating potential of the lead 40 is coupled via the contact terminal 9, and pole terminal 8 of the switching structure 110 and the lead 116 with the lead 114 connected to the tip line 32, the effective potential applied to the tip line 32 is "pulled" to a level that is definitely positive with respect to the common ground 18 and, therefore, additive with the negative potential with respect to ground that is being applied to the ring line 30, which is accomplished by the grounding of the negative terminal 44 of the source 24 and the coupling of the positive terminal of the source 42 via lines 124 and 126, the contact terminal 44 and pole terminal 5 of the switching structure 110 and the lead 118 and current limiting resistance 120 to the lead 114 connected with the tip line 32. Thus, during message alert signalling operation, the potential of the source 24 is added to the potential of the ring lead 38 to provide the aggregate potential required for firing of the message alert signalling indicator 62 at the corresponding telephone 26. A circuit traceable from the positive terminal 42 of source 24 through lead 122, contact terminal 10 and pole terminal 11 of the switching structure 110, current limiting resistance 132, the indicator 134 located in the control area 20, and lead 136 to the grounded negative terminal 44 of the source 24 is also completed during message alert signalling operation, so indicator 134 will be actuated to readily advise the operator within the control area 20 that the corresponding telephone 26 is in a mode other than normal telephone operation. Again, since the potential upon the coupling line 30 is negative with respect to the potential upon the coupling line 32, just as is the case with normal telephone operation, the unidirectional component 100 will prevent the flow of current through the coupling circuit 96 to essentially isolate the temperature controlling portions of the system from the telephone portions thereof during message alert signalling operation.

Referring now back to FIG. 1, which illustrates operation of the overall system in a mode for controlling the temperature within a room area 28, it will be observed first that the telephone system 22 is effectively disconnected by the switching structure 110 from the corresponding telephone 26 (which, of course, will not be needed for use while the room 28 is unoccupied and the temperature controlling operation of the apparatus is operative). It will significantly be further noted, however, that the same coupling lines 30 and 32 needed for telephone operation are also being utilized for accomplishing the temperature function. With the switching structure 110 in the condition illustrated in FIG. 1, the positive terminal 42 of the source 24 is coupled via lead 124, current limiting resistance 128, lead 130, contact terminal 1 and pole terminal 2 of the switching structure 110, lead 112, by ring coupling line 30 and lead 98 with the left most portion of the coupling circuit 96, while the negative terminal 44 of the source 24 is coupled via the lead 138, contact terminal 7 and pole terminal 8 of the switching structure 110, leads 116 and 114, the tip coupling line 32 and the lead 102 with the right most portion of the coupling circuit 96. With the noted connections, the polarity of the potential between the coupling lines 30 and 32 is reversed from that which exists during normal telephone operation or message alert signalling. Accordingly, the unidirectional component 100 will permit flow of current from the ring line 30 through the left most portion of the coupling circuit 96, the actuating means 90 and the right most portion of the coupling circuit 96 back to the tip line 32. The coupling circuit 96, including the thermostatic switches 104 and 106, then functions to control the actuating means 90 and its associated switching means 88 for controlling the operation of the heating and/or cooling device 72 of the temperature regulating equipment 70 in the manner previously described. As will be apparent, the indicator 134 in the control area 120 is also actuated during temperature controlling operation to indicate to the operator that the overall system is functioning for the particular room 28 in question in a mode other than normal telephone operation.

It should now be clear that the apparatus of this invention provides a simple, economical and effective solution to a problem that is becoming more and more significant due to the need for energy conservation, and which, insofar as I am aware, others have heretofore attempted to solve only by more complex and less economical approaches involving the running of separate temperature control lines to each room area for which temperature control is to be accomplished or providing superimposed signal systems requiring the use of special transmitters and receivers in conjunction with electrical power wiring (where that may be permitted by prevailing building and safety codes). It is also believed apparent that those skilled in the art may be expected to make minor variations and modifications to the apparatus herein disclosed for purposes of illustrating my invention, without departing from the essense and substance of the latter. Accordingly, it is to be understood that my invention should be deemed limited only by the fair scope of the claims which follow and should also be deemed to extend to equivalents of the subject matter thus claimed.

I claim:

1. In apparatus utilizing portions of a conventional telephone installation for selectively controlling electrically operated, temperature regulating equipment, wherein said installation includes a number of telephones each located within a corresponding remote area and having internal telephone components, internal electrical circuitry for intercoupling said components and a pair of externally extending, electrically conductive, connection leads electrically coupled with said circuitry, a pair of electrically conductive coupling lines for each telephone electrically coupled with said connection leads of the latter and extending to a central area, a central telephone system presenting within said central area for each telephone a pair of telephone line leads normally energized by said system with a direct current electrical potential therebetween, and terminal means presenting a source of direct current electrical potential within said central area, wherein each telephone further includes a handset shiftable between standby and use positions thereof, an electrically responsive message alert indicator and an internal electrical switching assembly responsive to the positioning of said handset for electrically coupling said indicator with said connection leads only when said handset is in said standby position thereof, and wherein said equipment includes a temperature altering device within each remote area having an electrical operating circuit adapted for coupling with a source of operating power for said device:
- electrical switching structure for each telephone selectively actuatable into at least a normal telephone operating condition and a temperature controlling condition,
- each switching structure being also selectively actuatable into a message alert signalling condition,
- each switching structure being operable, when in said normal telephone operating condition thereof, for electrically coupling said coupling lines for the corresponding telephone with said telephone line leads for said telephone for flow of electrical current due to said potential between said telephone line leads through said coupling lines in one direction,
- each switching structure being operable, when in said temperature controlling condition thereof, for electrically coupling said coupling lines for the corresponding telephone with said direct current source terminal means for flow of electrical current due to said potential between said source terminals through said coupling lines in a direction opposite said one direction,
- each switching structure being operable, when in said message alert signalling condition thereof, for electrically coupling one of said coupling lines for the corresponding telephone with one of said telephone line leads for said telephone and electrically coupling said direct current source terminal means in voltage adding series between the other of said coupling lines for said telephone and the other of said telephone line leads for said telephone.
- electrical switching means for each telephone electrically coupled with said operating circuit of the corresponding device for controlling the latter,
- each switching means being provided with an operably associated, electrically responsive, actuating means having a pair of electrically conductive, control leads; and
- electrical circuit means for electrically coupling said control leads of each switching means with said coupling lines for the corresponding telephone,
- each coupling circuit means being provided with unidirectional current flow means coupled therewith for permitting flow of electrical current through said coupling circuit means only when the corresponding switching structure is in its temperature controlling condition.

2. The invention as set forth in claim 1, wherein:
each of said coupling circuit means is provided with a thermostatically operated electrical switch located in the corresponding remote area and electrically coupled in series with said coupling circuit means.

3. The invention as set forth in claim 2, wherein:
each of said series coupled electrical switches is respectively opened and closed when the temperature within the corresponding remote area is respectively below and above a preselected low temperature limit level.

4. The invention as set forth in claim 1, wherein:
each of said coupling circuit means is provided with a thermostatically operated electrical switch located in the corresponding remote area and electrically coupled in shunt with said coupling circuit means.

5. The invention as set forth in claim 4, wherein:
each of said shunt coupled electrical switches is respectively opened and closed when the temperature within the corresponding remote area is respectively below and above a preselected high temperature limit level.

6. The invention as set forth in claim 1, wherein:
each of said coupling circuit means is provided with a thermostatically operated electrical switch located in the corresponding remote area and electrically coupled in series with said coupling circuit means,
each of said series coupled electrical switches is respectively opened and closed when the temperature within the corresponding remote area is respectively below and above a preselected low temperature limit level,
each of said coupling circuit means is provided with a thermostatically operated electrical switch located in the corresponding remote area and electrically coupled in shunt with said coupling circuit means,
each of said shunt coupled electrical switches is respectively opened and closed when the temperature within the corresponding remote area is respectively below and above a preselected high temperature limit level.

7. The invention as set forth in claim 6, wherein:
each of said switching means is electrically coupled in series with said operating circuit of the corresponding device,
each switching means being respectively opened and closed when its actuating means is respectively energized and deenergized.

* * * * *